Aug. 28, 1962   J. C. M. FROST   3,051,414
AIRCRAFT WITH JET FLUID CONTROL RING
Filed May 8, 1961   11 Sheets-Sheet 1

INVENTOR
J.C.M.FROST
BY
Maybee & Legris
ATTORNEYS

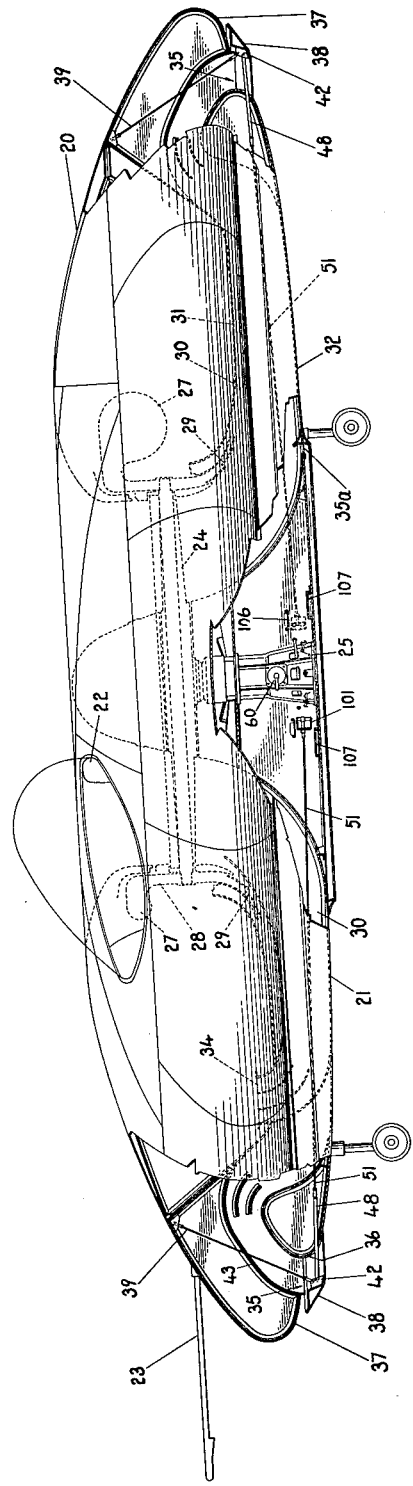

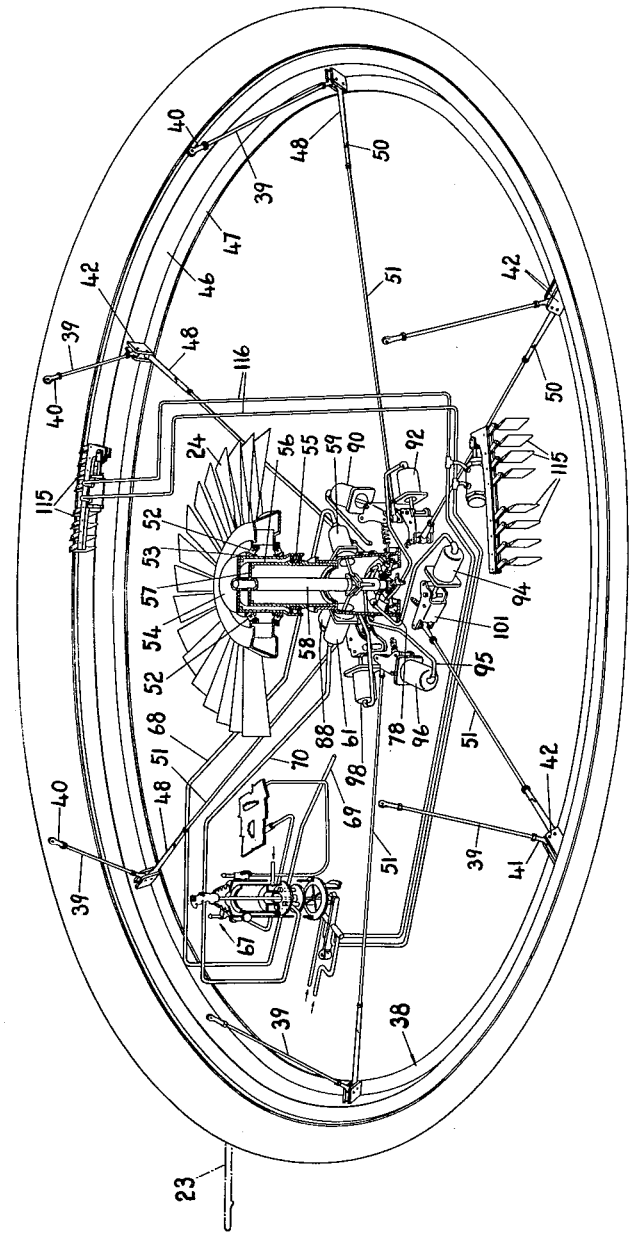

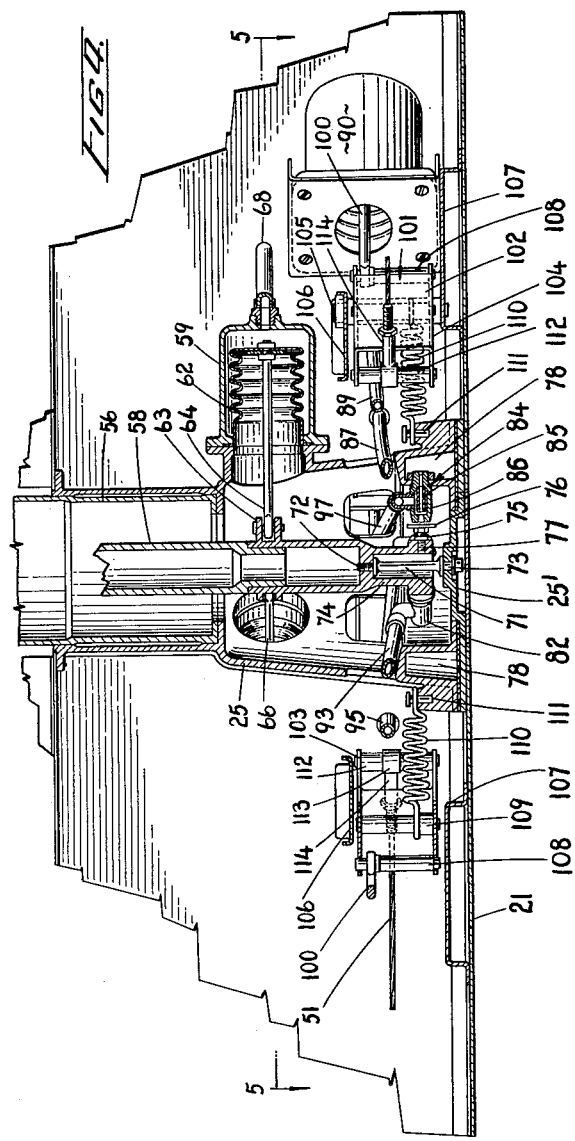

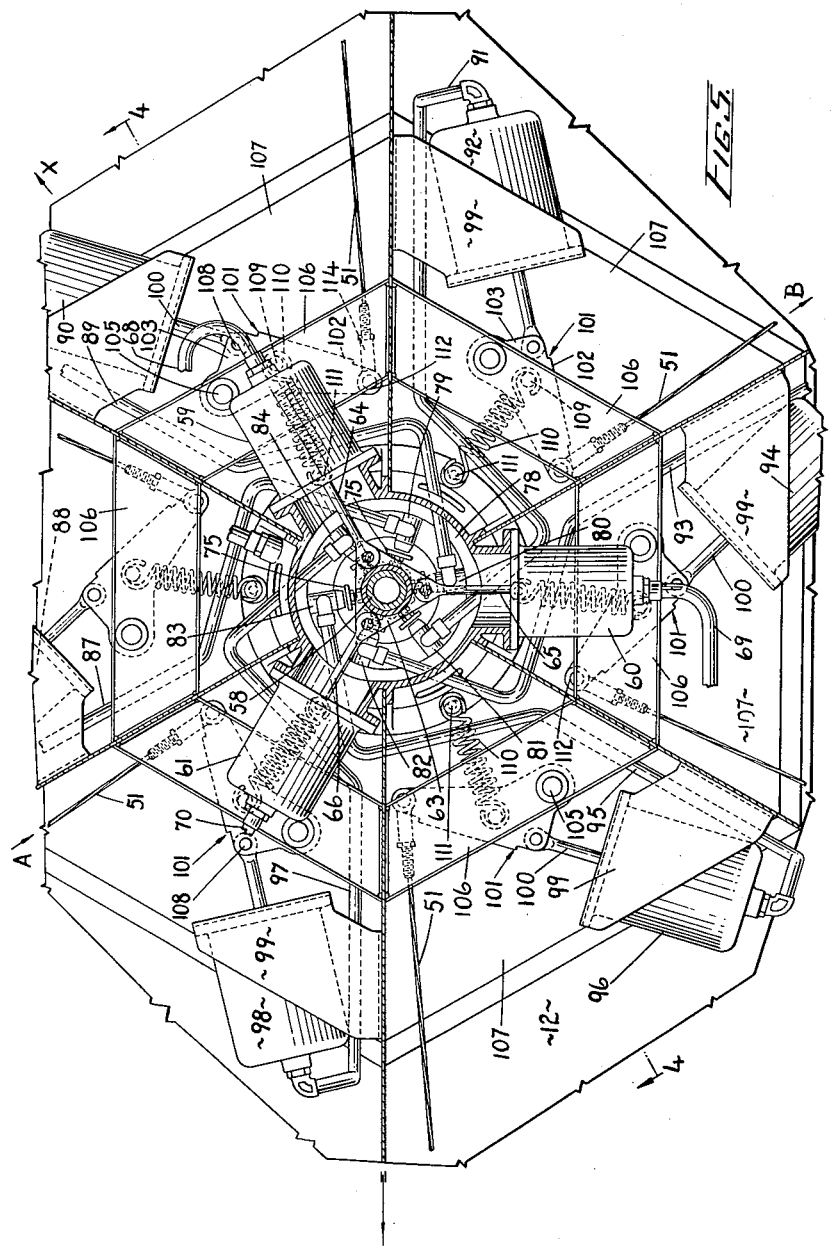

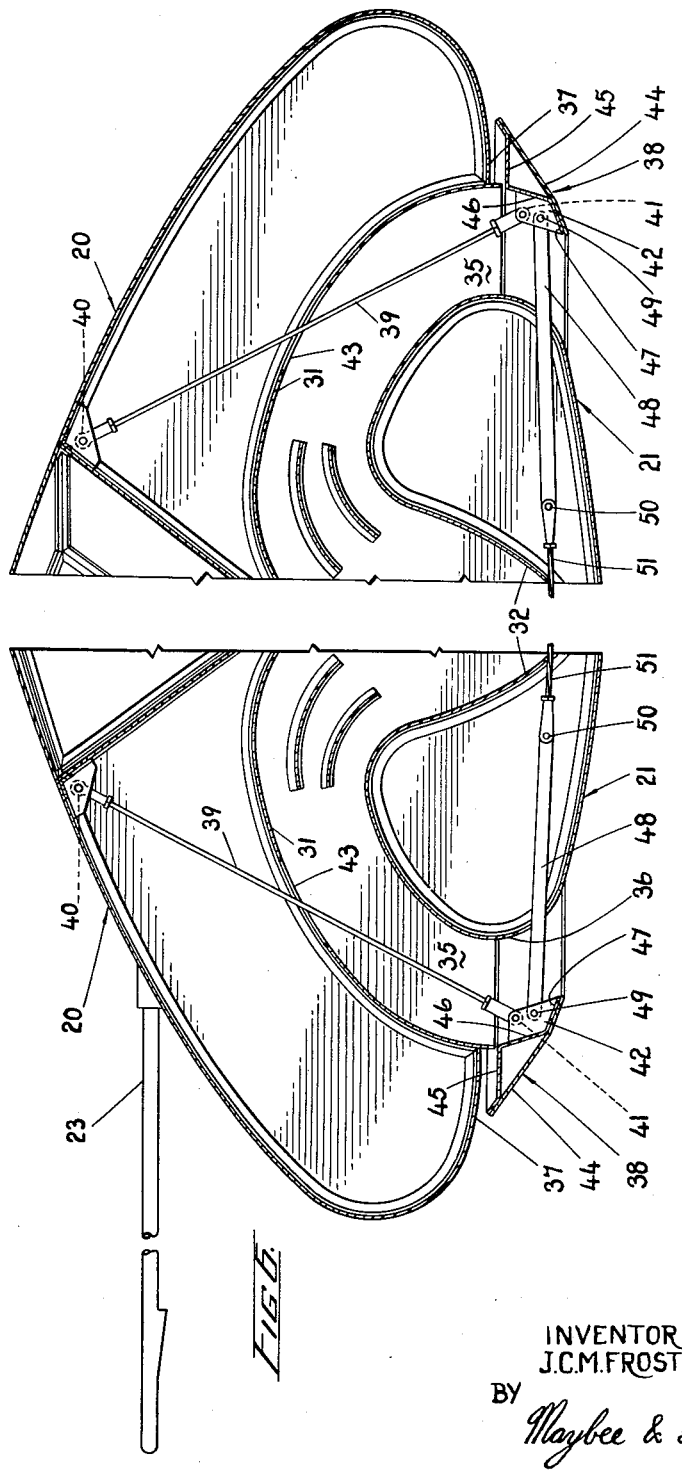

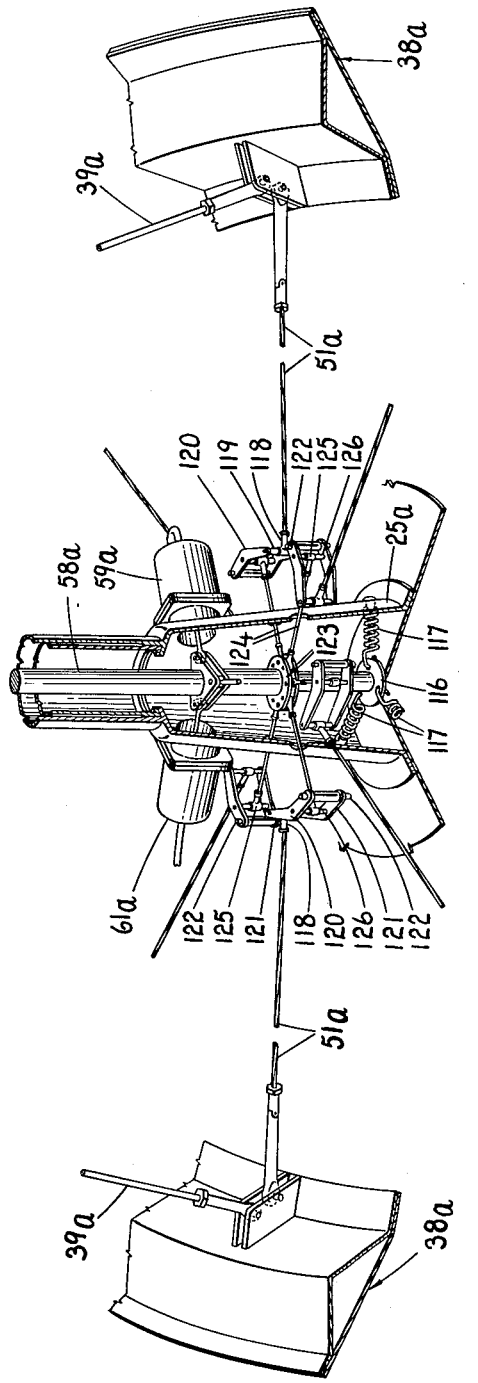

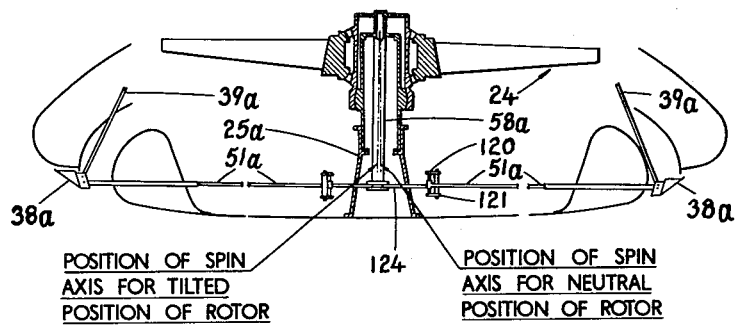
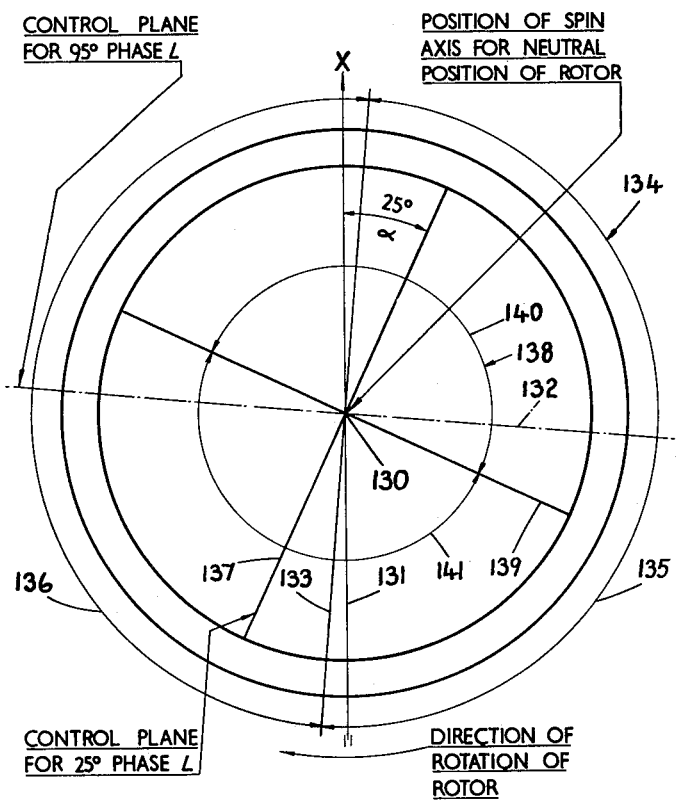

United States Patent Office 3,051,414
Patented Aug. 28, 1962

3,051,414
AIRCRAFT WITH JET FLUID CONTROL RING
John Carver Meadows Frost, Georgetown, Ontario, Canada, assignor, by mesne assignments, to A. V. Roe Canada Limited, Toronto, Ontario, Canada, a corporation
Filed May 8, 1961, Ser. No. 108,365
17 Claims. (Cl. 244—12)

This invention relates to aircraft and more particularly to an aircraft having a body structure and a propulsive nozzle which is preferably downwardly directed and has a mouth arranged to discharge at a multiplicity of positions distributed around a periphery on the underside of the structure; the aircraft derives propulsive thrust from the ejection of propulsive gas at high velocity through the propulsive nozzle.

The co-pending application Serial No. 832,404 dated August 6, 1959, of John Carver Meadows Frost and Claude John Williams discloses a circular aircraft having a lentiform inboard body structure sheathed by opposed aerofoil surfaces, which provide lift developing surfaces for the aircraft, and an outboard body structure secured to the inboard body structure. That aircraft has a gas displacement passage in the structure which includes and terminates in an outlet nozzle arranged to discharge at a multiplicity of positions distributed around the periphery of the structure, and the outboard body structure is arranged in juxtaposed spaced relation to the outlet nozzle to provide therewith upper and lower peripheral nozzles. Means is provided for impelling gas to flow through the gas displacement passage and through the outlet nozzle and the peripheral nozzles. Primary gas deflecting means is provided associated with the outlet nozzle to apportion the flow of gas between the peripheral nozzles, and secondary gas deflecting means is provided on the outboard body structure to vary the direction in which the propulsive gas leaves the peripheral nozzles.

The aircraft disclosed in said co-pending application has an impelling rotor to impel the gas along the gas displacement passage and the rotor is mounted for universal movement and biased to a neutral position within the inboard body structure. The rotor is operatively connected to the primary gas deflecting means whereby, when the rotor tilts from its neutral position, the gas deflecting means is operated to stabilize the aircraft.

A control system for the aircraft described in application Serial No. 832,404 is claimed in application Serial No. 832,406 filed on August 6, 1959, by John Carver Meadows Frost and Claude John Williams.

The present invention may be considered to be a development of the aircraft described in the above mentioned applications. The specifically described embodiment of the present invention differs from the aircraft described in said applications mainly in the arrangement of its propulsive nozzle and its gas control means. The aircraft of the present invention may use means identical to those disclosed in the previous applications to impel gas along a gas displacement passage which is arranged to terminate in a novel propulsive nozzle arrangement which is substituted for the outlet nozzle and the peripheral nozzles of the aircraft described in said applications. The aircraft of the present invention has gas directing means which is suspended adjacent to a boundary of the mouth of a propulsive nozzle, and the gas directing means has a gas control surface which is shaped to direct gas expelled from the mouth around a convex surface and preferably inboardly. The gas control surface forms a movable extension of the said boundary of the mouth of the nozzle and actuating means is provided to move the gas directing means on its suspension means thus to vary the position of the gas control surface relative to said mouth and to variably control the direction of flow of propulsive gas expelled from the mouth.

In a preferred form of the aircraft according to the present invention, the engine means for impelling gas along the gas displacement passage includes an impelling rotor which is universally mounted in the structure and is biased to a neutral position relative to the structure. The rotor is operatively connected to the gas directing means whereby tilting of the rotor from its neutral position operates the gas directing means to stabilize the aircraft. As in the aircraft described in the above mentioned applications, pilot-control means are provided to apply a tilting force to the rotor whereby the gas directing means may be moved in a desired direction.

The invention will now be described by way of example with reference to the accompanying drawings, in which like reference characters indicate similar parts throughout the several views, and in which:

FIGURE 2 is a side elevation of the aircraft of FIGURE 1 partly broken away to show the gas directing means and the actuating means therefor;

FIGURE 3 is a diagrammatic perspective view of the control system of the aircraft;

FIGURE 4 is a section on the line 4—4 of FIGURE 5 showing the inboard part of the control system shown in FIGURE 3;

FIGURE 5 is a horizontal section on the line 5—5 of FIGURE 4;

FIGURE 6 is a section of the outboard portions of the aircraft showing in detail the gas directing means and its method of suspension;

FIGURE 7 is a detail perspective view, partly broken away, of a modified form of control system for the gas directing means;

FIGURE 8 is a diagram showing the operation of the gas directing means of FIGURE 7 in response to tilt of the rotor from its neutral position;

FIGURE 9 is a diagram indicating the phase angle relationship between displacement of the rotor and operation of the gas directing means;

Figure 1:
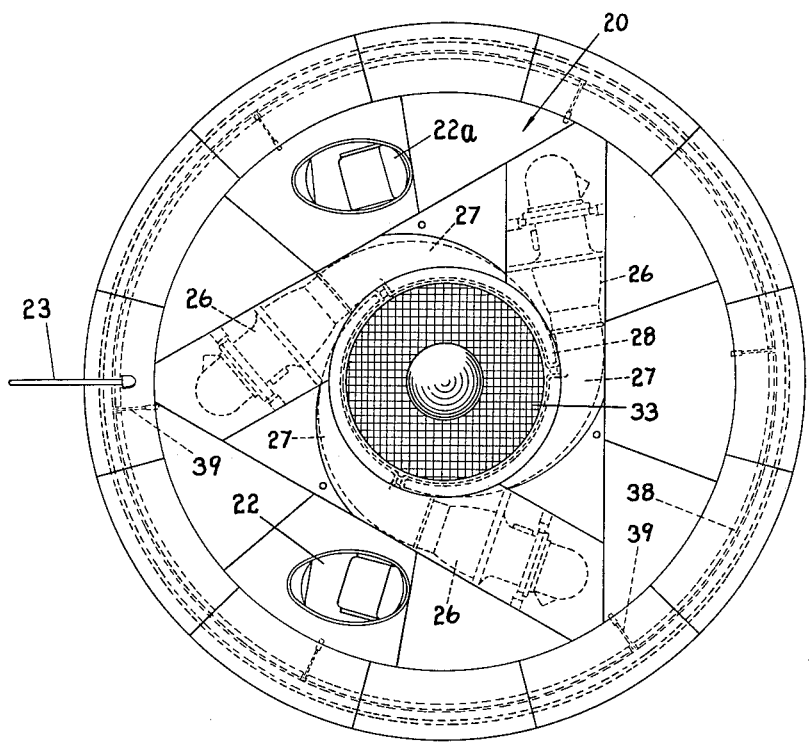
FIGURE 1 is a plan of an aircraft embodying the invention and showing the location of the engines and the gas directing means in phantom lines.

Referring now to FIGURES 1 and 2, the aircraft comprises a lentiform body structure which is sheathed by upper and lower aerofoil skins which provide lift surfaces for the aircraft. The skin providing the upper aerofoil surface is indicated at 20 and the skin providing the lower aerofoil surface is indicated at 21. The upper skin 20 is divided into various panels to facilitate access to the inside of the body structure. The aircraft has two cockpits 22 and 22a, for a pilot and observer respectively, and a pivot head located at the forward end of a boom 23. The aircraft includes an impelling rotor 24 mounted substantially centrally within the aircraft for universal movement on a base indicated generally at 25. The rotor 24 has turbine blades at its periphery and is rotated by means of gas turbine engines 26 which discharge propulsive gas through "tusk" manifolds 27 into a ring manifold 28. The propulsive gas from the gas turbine engines passes through exhaust boxes 29 into a gas displacement passage 30 defined between upper and lower walls 31, 32 respectively in the body structure, the lower wall 32 being formed by the upper surface of the lower aerofoil skin 21. The impelling rotor 24 draws air through a grating 33 and delivers the air into the gas displacement passage 30. The body structure of the aircraft is made up of radially disposed ribs so that the gas displacement passage comprises a number of segment-shaped elements. Three of these elements stop short of the periphery of the structure and provide air inlets for the engines, one of said air inlets being indicated at 34 in FIGURE 2.

For a more detailed description of the skeletal structure of the aircraft, the impelling rotor, the gas displacement passage and the arrangement of the gas turbine engines, reference should be made to the structure described in the aforementioned applications Nos. 832,404 and 832,406, since in each respect the structure of the present aircraft is similar thereto.

Throughout the description and in the claims, certain terms of positional relationship are used for convenience. The terms "outboard" (or "outboardly") and "inboard" (or "inboardly") denote, respectively, greater and lesser distances from the spin axis of the rotor or the approximate center of the propulsive nozzle when the latter is viewed in plan. The terms "vertical," "upwardly" and "downwardly" denote directions approximately substantially normal to the medial, or chord, plane between the upper and lower aerofoil surfaces.

The gas displacement passage 30 terminates in a downwardly directed propulsive nozzle having an annular mouth 35 in the underside of the structure. The lower wall 32 forms the inboard boundary of the mouth as indicated at 36 and merges with the lower aerofoil skin 21 in a smooth, outboardly convex surface. The upper wall 31 forms the outboard boundary of the mouth 35 as indicated at 37. A central stabilizing nozzle 35a (see FIGURE 2) is formed in the lower skin 21 inboardly of the main propulsive nozzle mouth 35.

Gas directing means in the form of a gas control ring 38 is suspended adjacent to, and beneath, the outer boundary 37 of the nozzle; the arrangement is best shown in FIGURES 2, 3 and 6. The ring 38 extends around the entire periphery of the annular propulsive nozzle and is supported by six links 39 spaced circumferentially around the body structure. The links 39 are universally mounted at their upper ends 40 to the body structure and are secured at their lower ends 41 with limited universal movement between spaced pairs of plates 42 secured to the ring. The links pass through apertures 43 in the upper wall 31 and suspend the ring 38 for movement relative to the mouth 35 of the nozzle.

The ring 38 is formed of two parts, an outer part 44 and an inner part 45 shaped so as to enclose, with the part 44, a triangular space as shown in FIGURE 6. This box-section construction gives rigidity to the ring and the triangular space may be filled with a foamed plastic material to reinforce the ring. The inboard surface of the part 45 provides as gas control surface which may be considered to be in two parts; an upper part 46 which is directed slightly inboardly and a lower part 47 which is directed more steeply inboardly. The parts 46, 47 together constitute a gas control surface which directs propulsive gas leaving the mouth 35 generally inboardly towards the center of the aircraft.

The gas control surface constituted by the parts 46, 47 itself constitutes a movable extension of the outboard boundary 37 of the mouth 35 of the propulsive nozzle and, as the ring 38 moves on its suspension links 39, the position of the gas control surface relative to the mouth will vary and will thereby control the direction of flow of the propulsive gas expelled from the mouth 35 of the nozzle.

The movement of the gas control ring 38 is controlled from the impelling rotor 24 as will now be described and is connected to the impelling rotor by a plurality of spaced outboardly extending links. The outboard part of each link is in the form of a rod 48 universally secured at 49 to the pairs of plates 42 on the ring 38; the rods 48 are in turn pivotally connected at 50 to wire-rope cables 51.

Referring now to FIGURE 3, the impelling rotor 24 is rotatably mounted by means of thrust bearings 52 upon an outer sleeve 53, the upper end of which is closed by a diaphragm 54. The outer sleeve 53 is mounted by means of part-spherical bearings 55 on an inner sleeve 56 which in turn is secured to the base 25; the inner sleeve 56 is closed at the top by a diaphragm 57. An actuating shaft 58 passes through the diaphragm 57 and is secured at its upper end in an aperture in the diaphragm 54. The diaphragm 57 provides a fulcrum for the actuating shaft 58 whereby, as the rotor 24 tilts about the bearings 55, the actuating shaft 58 tilts about the diaphragm 57. A more detailed description of the mounting of the rotor on the inner and outer sleeves will be found in the aforesaid applications.

Referring now to FIGURES 3, 4 and 5, the base 25 has secured thereto three fluid-operated jacks 59, 60 and 61. The jacks are disposed radially of the base 25 and, when viewed in plan, are spaced at 120° intervals. Each jack includes a corrugated bellows, such as that shown at 62 in FIGURE 4 for the jack 59, to which is secured one end of an actuating rod 64, the other end of the rod 64 being secured to the actuating shaft 58. The actuating shaft 58 is provided with spaced flanges 63 to which actuating rods 64, 65 and 66 are pivotally connected, the actuating rods being connected to the bellows of the jacks 59, 60 and 61 respectively. The jacks 59, 60 and 61 are operatively connected to a pilot's control column indicated generally at 67 in FIGURE 3 by means of conduits 68, 69 and 70 respectively. The control column is constructed in accordance with the teaching in the aforementioned applications. Operation of the control column by the pilot will vary the fluid pressures in the conduits 68, 69 and 70 to cause the bellows of the jacks 59, 60 and 61 to move the actuating rods 64, 65, 66 thus applying a force to the actuating shaft 58. The force applied to the actuating shaft will tend to rock the shaft about the fulcrum provided by the diaphragm 57 and will result in the application of a tilting force to the rotor 24. As in the aforementioned applications, the arrangement is such that if the pilot moves the control column in a first direction, the tilting force applied to the rotor will be in a second direction advanced 90° from the first direction in the direction of rotation of the rotor.

Referring now to FIGURE 4, the lower end of the actuating shaft 58 is secured to a torsion bar 71 the upper end of which is threaded at 72 into a bore provided in the lower end of the actuating shaft. The lower end of the torsion bar is secured at 73 to a base member 25' which is attached to the bottom of the base 25. The torsion bar 71 constitutes biasing means which tends to keep the rotor in a neutral position with its spin axis parallel to the axis of the inner sleeve 56.

There will now be described the means for transmitting the effect of tilting movements of the rotor to the gas control ring. Referring in particular to FIGURES 4 and 5, the lower end of the actuating shaft 58 is provided with a sleeve 74 which surrounds the torsion bar 71. Secured to the outer surface of the sleeve are six abutments or tappets 75, each tappet having a flat disc-like head 76 and a threaded shank 77 whereby the distance that the head is spaced from the center of the actuating shaft may be adjusted. As will be seen from FIGURE 5, the six tappets are spaced equiangularly around the periphery of the lower end of the actuating shaft. Formed in the bottom of the base 25 is a ring manifold 78 which is provided with high-pressure air bled from the compressors of the engines 26. Mounted in the inboard wall of the ring manifold 78 are six pressure-sensing nozzles 79, 80, 81, 82, 83 and 84, each nozzle projecting into the annular space between the ring manifold and the sleeve 74 which constitutes the base of the actuating shaft 58. Each nozzle comprises an inner nozzle element and an outer nozzle element, for example, as shown in FIGURE 4, the nozzle 84 has an inner nozzle element 85 and an outer nozzle element 86 which discharges adjacent to the disc-like head 76 of one of the tappets 75. The inner nozzle element 85 is mounted in a chamber within the outer nozzle element 86 and the chamber of each outer nozzle element is connected by a conduit to a fluid-operated actuator as will hereinafter be described.

The operation of each pressure-sensing nozzle is as follows: high pressure air passes through the inner nozzle element 85 into the chamber in the outer nozzle element and out of the outer nozzle element 86 to impinge against the head 76 of a tappet 75 so that a pressure is maintained in the chamber. If now the head 76 approaches the outer nozzle element 86, the pressure in the chamber will increase whereas, if the head 76 moves away from the outer nozzle element 86, the pressure in the chamber will decrease. It follows that the spacing between the tappet and the nozzle will control the pressure, or back pressure, in the chamber.

Referring now to FIGURE 5, the nozzle 79 is connected by a conduit 87 to a fluid operated actuator 88; the nozzle 80 is connected by a conduit 89 to a fluid-operated actuator 90; the nozzle 81 is connected by a conduit 91 to a fluid-operated actuator 92; the nozzle 82 is connected by a conduit 93 to a fluid-operated actuator 94; the nozzle 83 is connected by a conduit 95 to a fluid-operated actuator 96; and the nozzle 84 is connected by a conduit 97 to a fluid-operated actuator 98. The actuators 88, 90, 92, 94, 96 and 98 are secured to the body structure upon brackets 99 and each of the actuators is connected to one of the wire rope cables 51 which are connected at their other ends to the rods 48 and thus to the gas control ring 38.

Each of said actuators is connected to a wire rope cable 51 through a composite lever as will be described with reference to FIGURES 4 and 5 for the actuator 90, the arrangement for each of the other actuators being similar. The actuator 90 has an actuating rod 100 which is connected to a lever indicated generally at 101. The lever is substantially of U-shaped cross-section and comprises a web 102 and upper and lower flanges 103 and 104 respectively. The lever is pivotally mounted on a pin 105 which extends between upper and lower brackets 106, 107 secured to the body structure. The actuating rod 100 is formed with an eye at its free end to pivotally embrace a pivot pin 108 extending between the flanges 103, 104 of the lever. A further pin 109 having reduced ends is mounted between the flanges 103, 104 and has secured thereto one end of a tension spring 110; the other end of the spring 110 is secured by a stud 111 to the base 25. Another pin 112 extends between the upper and lower flanges 103, 104 of the lever, the pin 112 having reduced ends which pass through apertures in the flanges 103, 104. Embracing the pin 112 is a sleeve 113 having a cylindrical extension 114 to which the inner end of a wire rope cable 51 is secured.

Considering the lever 101 as a whole, it is pivoted about the pin 105 and may be rocked about the pin by means of the actuator 90 through the actuating rod 100. As the lever is rocked about pin 105 it will either draw the cable 51 to which it is attached inboardly or will allow it to move outboardly; the spring 110 acts on the lever 101 to tend to draw the cable 51 inboardly.

Referring now to FIGURE 3, the aircraft is controlled in yaw by sets of rudder blades 115 mounted in the gas displacement passage 30 and which are controlled through fluid conduits 116 from the base of the control column 67 in a manner identical to that described in aforesaid applications.

In FIGURE 7 there is shown a modification of a control system previously described. In the modified system the links which are secured to the gas control ring are mechanically connected, through pivoted levers, to the actuating shaft of the rotor.

Referring now to FIGURE 7, the gas control ring is indicated at 38a and is suspended from the structure by links 39a in the same manner as in the previous embodiment. The actuating shaft of the rotor is indicated at 58a and is moved by fluid-operated jacks, two of which are shown at 59a and 61a, in the same manner as in the previous embodiment. The base of the actuating shaft is provided with a flange 116 to which are attached the inner ends of three tension springs 117, the outer ends of the tension springs being secured to the base 25a which supports the rotor. The springs 117 constitute biasing means which tend to retain the actuating shaft 58a in a neutral position with its axis parallel to the axis of the fixed inner sleeve on which the rotor is universally mounted. The links between the actuating shaft and the gas control ring are similar to those previously described and the wire rope portions thereof are indicated at 51a. Each wire rope portion 51a is secured to a sleeve 118 which is pivotally mounted on a pin 119 received between upper and lower arms 120 and 121 of a composite lever, and each lever is pivoted about a pin 122 mounted on the body structure. The actuating shaft 58a is provided with spaced flanges 123 between which are pivotally received the inboard ends of links 124. The outboard end of each link 124 is connected to a sleeve 125 which in turn is mounted on a pin 126 received between the upper and lower arms 120 and 121 of one of the composite levers.

The operation of the aircraft described with reference to FIGURES 1 to 6 will now be outlined. When the gas turbine engines 26 are in operation they discharge propulsive gas into the "tusk" manifolds 27, the gas then flows into the ring manifold 28, drives the tip turbine of the rotor 24 and passes through the exhaust boxes 29 into the gas displacement passage 30. As the rotor 24 rotates it draws air in through the grating 33 and impels the air to flow outboardly along the gas displacement passage 30. The air mixes with the propulsive gas discharged from the exhaust boxes 29 and the mixture of gas and air is impelled outboardly along the gas displacement passage and is expelled from the mouth 35 of the downwardly-directed propulsive nozzle.

The gas ejected from the mouth 35 serves to control the aircraft and at least partly to sustain it. The aircraft, which is capable of hovering and of flight in any direction, is controlled by moving the gas control ring 38 relative to the outboard boundary 37 of the mouth 35. By suitable adjustment of the position of the ring 38, the aircraft may be made to hover, move forwardly or backwardly, climb, dive, or turn.

The shape of the aircraft makes it basically unstable aerodynamically and it is thus necessary to provide an automatic control system which will automatically operate the gas control ring 38 to stabilize the aircraft. It is equally necessary that a pilot-operated control system be provided to move the gas control ring to cause the aircraft to execute manoeuvres desired by the pilot. The gas control ring 38 is caused to move in response to movements of the actuating shaft 58 which may either be moved by the pilot or may be moved relative to the aircraft when the latter acquires a rate about an axis normal to the spin axis of the rotor. When the actuating shaft is moved by the pilot, the aircraft is caused to carry out a desired manoeuvre and, when the actuating shaft is moved by virtue of the aircraft acquiring a rate, the control system acts to stabilize the aircraft.

The gas control ring 38 has a central position shown in FIGURES 2 and 6 wherein the part 46 of the gas control surface substantially forms an extension of the outboard boundary 37 of the mouth of the nozzle and the annular space between the inboard edge of the part 47 on the gas control surface and the inboard boundary 36 of the nozzle has equal radial width around the whole periphery of the nozzle mouth. If now a point on the ring 38 is moved radially outboardly, the diametrically opposed point on the ring will move radially inboardly and, since the ring 38 is a unitary structure, each of the other points on the ring will move in accordance with its position on the ring. It will be appreciated that, during such a movement of the ring, around half the periphery of the ring the inboard edge of the part 47 of the gas control surface will move away from the inboard boundary 36 of the nozzle mouth 35 and around the other half of the periphery of the ring the inboard edge of the part 47 will move towards the inboard boundary 36. It follows that the effective area of the mouth of the nozzle, i.e. the area between the inboard edge of the part 47 and the inboard boundary 36, will be increased around half the periphery of the nozzle and will be decreased around the other half of the periphery of the nozzle. The plane of division between that half of the nozzle mouth which increases in effective area and that half which decreases in effective area is perpendicular to the plane containing the point which moves radially outboardly and the center of the nozzle, and itself passes through the center of the nozzle.

Figure 10:
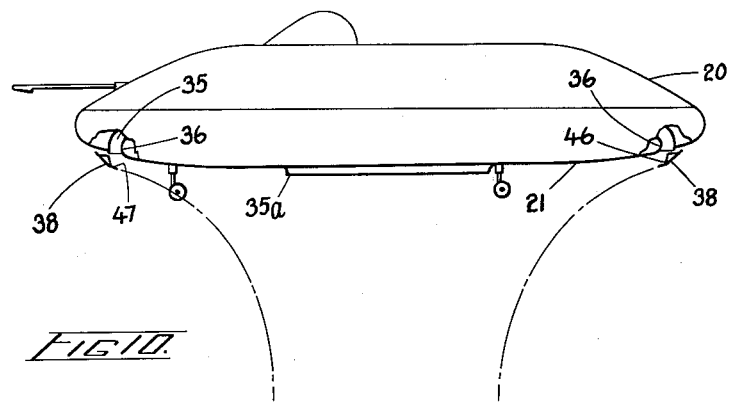
FIGURE 10 shows, in diagrammatic form, the gas flow from the aircraft when the latter is hovering sufficiently high above the ground to be clear of the "ground-cushion" effect.
Figure 11:
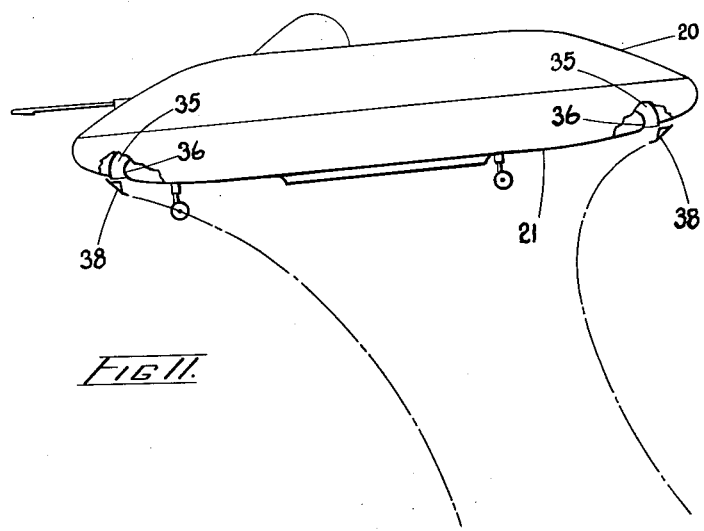
FIGURE 11 shows, in diagrammatic form, the gas flow from the aircraft when the latter is travelling in forward flight.

Referring now to FIGURES 10 and 11, the resulting gas flow from the mouth 35 when the ring is in its central position and in a displaced position will be explained. In FIGURE 10 the aircraft is shown hovering at a height above the ground sufficient to avoid the "ground cushion" effect. The gas control ring 38 is in its central position and the parts 46, 47 of the gas control surface direct the propulsive gas ejected from the mouth 35 inboardly around the whole periphery of the nozzle mouth. The annular stream of propulsive gas is deflected inboardly around the smoothly curved inner boundary 36 of the nozzle mouth and then breaks away from the underside of the aircraft to flow substantially vertically downwardly. It will be seen from FIGURE 10 that the gas stream has, as it were, an "hour-glass" shape. The annular jet from the mouth 35 forms a tubular curtain of gas and the center of the curtain is filled with gas ejected from the central stabilizing nozzle 35a.

The deflection of the gas inboardly around the smoothly curved inboard boundary 36 of the mouth 35 is due to the Coanda effect. It is known that, if one boundary of a nozzle is extended further in the direction of gas flow than the other boundary of the nozzle and is caused to curve smoothly away from said other boundary, then gas flowing through the nozzle will be deflected around said curved boundary; this is known as the Coanda effect. The Coanda effect has a further property which is that, for a nozzle of given area, if the radius of curvature of the curved boundary is increased, the gas is deflected further around said curved boundary without breaking away therefrom than if the boundary had a lesser radius of curvature. This property may be stated conversely for a nozzle having a boundary curving away from the mouth of the nozzle with an invariable radius of curvature. If, for such a nozzle, the thickness of the gas jet is decreased, then the gas will be deflected further around the curved boundary before breaking away therefrom than would a thicker gas jet. This latter property is taken advantage of in the present invention.

In FIGURE 10, the aircraft is shown as being supported on the top of a substantially tubular curtain of gas; the gas is caused to flow some way across the underside of the aircraft before breaking away to flow generally vertically downwards. In FIGURE 10 the center of pressure of the curtain is in line with the center of gravity of the aircraft. If now the gas control ring is moved, as will hereinafter be described, the tubular curtain of gas is given an inclination relative to the aircraft and the center of pressure of the curtain is moved away from the center of gravity of the aircraft. In FIGURE 11 the aircraft is shown with the gas control ring 38 moved rearwardly which has the effect of reducing the effective area of the mouth of the propulsive nozzle around the forward half of the nozzle periphery and increasing the effective area of the mouth around the rear half of the nozzle periphery. As a result, the thickness of the gas stream around the forward half of the periphery is reduced; this has the same effect as increasing the radius of curvature of the inner boundary of the nozzle so far as the gas stream is concerned. It follows that the gas emerging from the forward half of the nozzle mouth will be deflected further around the inboard boundary 36 of the mouth before breaking away from the underside of the aircraft. A comparison of FIGURES 10 and 11 will clearly show this effect.

Conversely, the rearward movement of the half of the ring adjacent to the rear half of the propulsive nozzle mouth will increase the effective area of the rear half of the mouth thereby, in effect, decreasing the radius of curvature of the inner boundary 36 so far as the gas stream is concerned. It follows that the gas emerging from the rear half of the nozzle will be deflected through a lesser angle than in the circumstances of FIGURE 10 and will break away from the underside of the aircraft in a position outboard of that at which it broke away in FIGURE 10. A comparison of FIGURES 10 and 11 will clearly show this effect.

Thus the result of moving the gas control ring rearwardly is that the tubular curtain of gas is inclined relative to the aircraft and the center of pressure of the curtain is moved rearwardly relative to the center of gravity of the aircraft thereby applying to the aircraft a nose-down couple. This couple will be balanced by the aerodynamic lift achieved by the aerofoil skins 20 and 21 so that the aircraft will move forwardly in a nose-down position. As the speed of the aircraft increases and the aerodynamic lift increases, the nose of the aircraft will rise until the latter is flying in a horizontal position. Since the tubular curtain of gas is inclined rearwardly the reaction of the curtain may be resolved into a vertical and horizontal component, the vertical component of the reaction will be directed upwardly and will partly sustain the aircraft (with the help of the aerodynamic lift) whereas the horizontal component will be directed forwardly and will move the aircraft forwardly.

It will be appreciated that while FIGURE 11 shows the gas control ring in a rearward position, the ring could have been moved in any direction and the aircraft would have been subjected to a couple and a propelling force similar to that described with reference to FIGURE 11 but in a different direction. By moving the gas control ring in the desired direction, therefore, the aircraft may be moved in any direction and a couple may be applied to the aircraft to cause it to tilt or to correct a tilt imposed by external conditions, such as a wind gust.

There now follows a description of the manner in which the gas control ring 38 is moved by the pilot in the embodiment shown in FIGURES 1 to 6.

As previously mentioned, operation by the pilot of his control column 67 operates the jacks 59, 60 and 61 to apply a tilting force to the actuating shaft 58 and thus to the impelling rotor 24. The phasing between the pilot's control column and the actuators 59, 60 and 61 is such that, if the pilot moves his column forwardly for example, the force applied to the actuating shaft 58 will be to the right, i.e. the force applied to the actuating shaft will be advanced 90° clockwise from the direction in which the pilot moved his control column.

When the pilot applies a tilting force to the actuating shaft 58 the rotor 24 will be caused to oscillate and will ultimately assume a deflected position (i.e. tilted from its neutral position) with a consequent deflected position of the actuating shaft. Considering FIGURES 4 and 5, let it be assumed that the actuating shaft 58 is in its neutral or central position so that each of the heads 76 of the tappets 75 is spaced equally from its associated pressure-sensing nozzle of the nozzles 79—84. In this position, the pressures in the chambers in all the nozzles will be equal, the pressures in the conduits joining the nozzles to the actuators will be equal and the pressures in the actuators 88, 90, 92, 94, 96 and 98 will be equal thereby pulling equally on the links 48, 51 and holding the gas control ring 38 in its central position.

Let it now be assumed that the pilot applies a tilting force to the actuating shaft 58 by operation of the actuators 59, 60 and 61, let it further be assumed that the resulting deflection of the bottom of the actuating shaft 58 is directly towards the nozzle 84 and directly away from nozzle 81 i.e. in the direction of the arrow X in FIGURE 5. The head 76 of the tappet 75 associated with nozzle 84 will approach the latter and will increase the pressure in the conduit 97 and in the actuator 98. The actuator 98 will rock its associated lever 101 in a clockwise direction and will pull its associated cable 51 inboardly, i.e. in the direction of the arrow A in FIGURE 5. Conversely, the head 76 of the tappet 75 associated with the nozzle 81 will move away from the nozzle and will thereby decrease the pressure in the conduit 91 and in its associated actuator 92. The actuator 92 will thereupon rock its associated lever 101 in an anti-clockwise direction and its associated cable 51 will move outboardly, i.e. in the direction of the arrow B in FIGURE 5.

It follows that the point on the gas control ring which is secured to the cable 51 operated by actuator 98 will move inboardly in the direction of the arrow A and the diametrically opposed point on the ring 38 which is connected to the cable 51 operated by the actuator 92 will move outboardly and that the ring will move bodily into the direction of the arrows A and B. It will be appreciated that the remaining nozzles 79, 80, 82 and 83 will cause operation of their associated actuators in proportion to the positions of the respective nozzles between the nozzles 81 and 84 and that all the actuators will co-operate to move the gas control ring bodily.

The angle, measured clockwise, between the direction X and the direction A, B is 95°. Referring to the diagram of FIGURE 9, the central point 130 represents the position of the spin axis of the rotor when the latter is in its neutral position. If now the rotor tilts, the spin axis of the tilted rotor will lie in a plane containing the neutral position 130 of the spin axis; let it be assumed that this plane is that represented by the line 131 in FIGURE 9 and that the base of the actuating shaft 58 has moved in the direction of the arrow X in FIGURE 9 which corresponds to the direction of the arrow X in FIGURE 5. The plane containing the neutral position 130 of the spin axis of the rotor and being advanced 95° clockwise from the direction X is represented by the line 132 in FIGURE 9. The points on the gas control ring which will be moved furthest in inboard or outboard directions by movement of the base of the actuating shaft in the direction X will be those lying in the plane 132, i.e. those points connected to the actuators 98 and 92. Other points on the ring 58 will be moved inboardly or outboardly in proportion but two diametrically opposed points on the gas control ring which will not be moved at all in inboard or outboard directions are those in the plane containing the point 130 and lying at right angles to the plane 132, i.e. the points lying in the plane represented by the line 133.

If the circle 134 in FIGURE 9 is taken to represent the gas control ring 38, then that part of the gas control ring represented by the semi-circle 135 will move outboardly, thereby increasing the effective area of the nozzle mouth around that part of the ring, and the part of the ring represented by the semicircle 136 will move inboardly, thereby decreasing the effective area of the nozzle mouth around that part of the ring. The semi-circles 135, 136 are separated by the plane 133 and the points on the gas control ring and lying in the plane 133 do not partake of any inboard or outboard movement. The plane at which the maximum inboard or outboard movement takes place is hereinafter called the "control plane" and, since the angle between the direction in which the base of the actuating shaft moves and the control plane is 95°, the terminology used is that the phase angle of the control system is 95°. A phase angle of 95° signifies that, if the base of the actuating shaft moves in a given direction as the rotor tilts, the points on the gas control ring which move inboardly or outboardly the greatest distance will lie in a plane at 95° to the plane containing the neutral and tilted positions of the spin axis of the rotor.

In the said foregoing applications there is described a control system for an aircraft of the same general shape as that described in the present application. The aircraft described in said foregoing applications has a rotor rotatable about a spin axis and having a neutral position relative to the body structure of the aircraft and the rotor is connected to gas deflecting means to control the aircraft. Associated with the rotor is biasing means to bias the rotor to its neutral position and to allow relative movement between the rotor and the body structure, with consequent tilting of the rotor from its neutral position and the application of a gyro-couple to the aircraft, when the aircraft acquired a rotational velocity about a turn axis lying normal to the spin axis of the rotor. The control system causes operation of the gas deflecting means lying adjacent to a control plane which contains the position of the spin axis of the rotor corresponding to the neutral position of the rotor and is advanced in the direction of rotation of the rotor by a phase angle $\alpha$ relative to the plane containing the positions of the spin axis corresponding to the neutral and tilted positions of the rotor. The phase angle $\alpha$ is defined to lie between 0° and 90° and the couple applied to the aircraft by the control system can be resolved into two components, a first component proportional to cosine $\alpha$ and which amplifies the gyrocouple applied to the aircraft by the rotor and a second component proportional to sine $\alpha$ which directly opposes the rotational velocity of the aircraft. It is further described in said foregoing applications that the purpose of amplifying the gyro-couple is to cause the aircraft to act as though it contains a larger gyroscope than in fact it does.

It has been found that, when the above described control system is operated, the rotor and the aircraft oscillate due to the amplified gyro-couple and that these oscillations are the more severe the nearer the phase angle approaches 0°, i.e. the more the gyro-couple is amplified. Even when the gyro-couple is not amplified, i.e. with a 90° phase angle, there is some oscillation of the aircraft. Where the aircraft is provided with sufficient control power, i.e. sufficient reaction from the discharged propulsive gas, phase angles between 0° and 90° may be used successfully since the oscillations are rapid and their amplitude small. However, where the control power is low the oscillations of the aircraft are slow and build up to large amplitudes which is very unpleasant for the pilot.

It has now been found that, by increasing the phase angle of the control system to a value greater than 90°, the gyro-couple applied to the aircraft by the rotor can be reduced and in some cases eliminated by the resulting force applied to the aircraft by the propulsive gas, thereby reducing or eliminating the undesirable oscillation of the aircraft even when low control powers are used. While there may be only one particular setting of the controls at which the gyro-couple is completely eliminated by the control force applied by the propulsive gas to the aircraft, the increase of the phase angle to a value greater than 90° provides a control force component which will oppose and reduce the gyro-couple and will thereby reduce the consequent oscillation of the aircraft.

The response of the aircraft of FIGURES 1 to 6 will now be described with reference to FIGURES 12 and 13 each of which shows a series of eight graphs. The graphs of each series show the following displacements and velocities:

(A) The roll angle of the aircraft in radians, (B) The roll rate or roll velocity of the aircraft in radians per second, (C) The pitch angle of the aircraft in radians, (D) The pitch rate or pitch velocity of the aircraft in radians per second, (E) The amount of roll of the rotor within the aircraft measured as a percentage of its maximum roll which is set by structural limitations and may, for example, be $\pm 1/100°$ from the neutral position, (F) The pitch of the rotor within the aircraft measured as a fraction of its maximum pitch which is limited as is the maximum roll, (G) The displacement of the gas control ring to the left and right of its central position measured as a fraction of its total permitted movement, and (H) The displacement of the gas control ring in fore and aft directions from its central position measured as a fraction of its total permitted movement.

Figure 12:
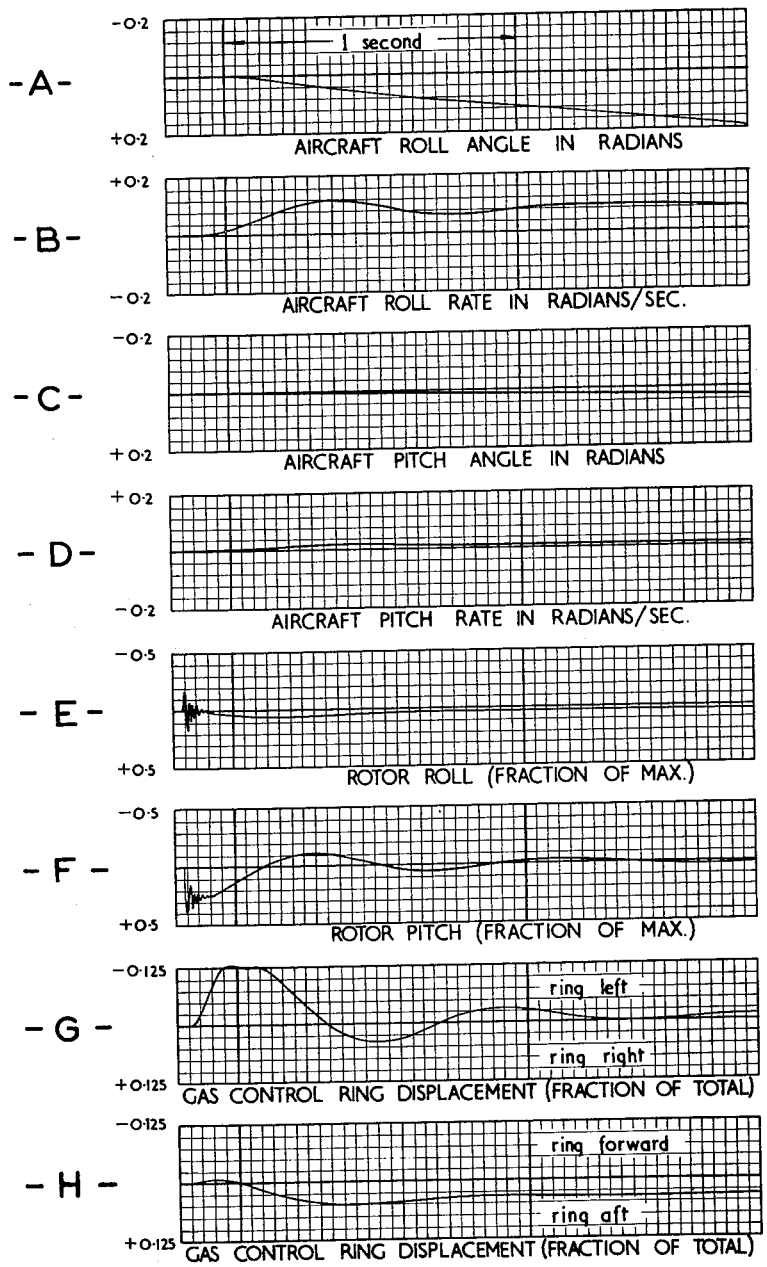
FIGURE 12 is a set of graphs showing the response of the aircraft of FIGURES 1 to 6 to a control input applied by the pilot.

The graphs of FIGURE 12 show the response of the aircraft if, when it is hovering, the pilot moves his control column to the right. The amount which the control column is moved to the right is measured in terms of the resulting movement of the rotor, which is expressed as a percentage of the total permitted movement of the rotor in any direction, the various movements being considered as if the aircraft were on the ground with the rotor stationary. Thus, as mentioned above, the total movement of the rotor in any direction from its neutral position might be $1/100°$, therefore if the pilot moves his control column 10% to the right this means that he has moved his column sufficiently so that, with the aircraft on the ground and the rotor stationary, the rotor would move from its neutral position by 10% of $1/100°$. As explained above, movement of the control column is 90° out of phase with the resulting force applied to the actuating shaft 58 so that, as the pilot moves the column to the right, for example, the actuators 59, 60, 61 will apply a pitching moment to the rotor by rocking the actuating shaft 58. Moreover, the graphs have been prepared on the assumption that the pilot's input is a step input, i.e. a sudden input and not a slow movement in the desired direction.

Returning now to FIGURE 12, as a result of movement of the column to the right, there is applied, through the actuating shaft 58, a pitching moment to the rotor which, as a result, acquires a pitch velocity or pitch rate; as soon as the rotor acquires this rate it is affected by the gyroscopic laws of motion and precession. Reference to graphs E and F of FIGURE 12 shows that the rotor initially pitches, then rolls and then oscillates both in roll and pitch. The oscillations in roll rapidly die out to leave a small deflection in roll while the oscillations in pitch decrease in frequency.

The resulting displacement of the gas control ring 38 may be seen from the graphs G and H and the total displacement of the ring may be considered to be made up of two components at right angles, the displacement in left and right directions (viewed from the rear of the aircraft) is shown in the graph G and the displacement in fore and aft directions is shown in the graph H. Considering first the displacement in right and left directions, the ring is first moved to the left. This has the effect of increasing the effective area of the portion of the mouth of the propulsive nozzle at the left of the aircraft (viewed from the rear of the aircraft) and decreasing the effective area of the portion of the mouth of the propulsive nozzle at the right of the aircraft. The tubular curtain of gas ejected from the propulsive nozzle will thus be tilted to the left of the aircraft and the tilted curtain of gas will apply a moment to the aircraft as described above with reference to FIGURE 11 and will tend to cause the aircraft to bank to the right. The ring is then displaced to the right to tilt the hollow curtain of propulsive gas to the right of the aircraft and will check the roll rate of the aircraft as may be seen with reference to graph B in FIGURE 12. The left and right displacement of the control ring shown in the graph G therefore causes the aircraft to have a steadily increasing roll angle as shown in graph A and a substantially constant roll rate as shown in graph B.

The gas control ring also has a component of deflection in the aft direction which, as described with reference to FIGURE 11, applies a nose-down couple to the aircraft. As the pilot moves his column to the right he applies a tilting force to the actuating shaft 58 tending to move the base of the shaft to the rear. Due to the laws of gyroscopic precession, the rotor will cause the base of the actuating shaft to move to the left. However, the application of a nose-down couple to the aircraft will tilt the rotor and will tend to cause the base of the actuating shaft to move to the right. The movement of the rotor which tends to move the base of the actuating shaft to the left applies a couple to the aircraft known as the "gyro-couple" and this couple is opposed by the nose-down couple on the aircraft which tends to move the base of the actuating shaft to the right. It will be seen from graph E that the rotor has a slight deflection in pitch after some initial oscillations which are rapidly damped. It will also be seen from graphs C and D that the aircraft has hardly any pitch angle or pitch rate.

The series of graphs in FIGURE 12 should be compared with similar graphs in the aforesaid applications which show the response for a control system having a phase angle of 20°. From the latter it will be seen that the aircraft acquires a pitch rate and, with low control powers, it has been found that this pitch rate builds up so that the aircraft performs slow oscillations of large amplitude which are unpleasant and undesirable.

As more fully described in the aforementioned applications, the behaviour of the aircraft under the influence of the control system will be somewhat different in forward flight than in hovering. When the aircraft is in forward flight there is a de-stabilizing moment acting on the aircraft which is not present when the aircraft is hovering. The effect of the de-stabilizing moment is to cause a divergence of the aircraft from the position shown when hovering and this divergence has to be corrected by the pilot.

The operation of the automatic stabilization system of the embodiment shown in FIGURES 1 to 6 is similar to the pilot-operated system, except that the rotor is tilted not by means of the pilot applying a tilting force to the actuating shaft but by means of a displacement or angular velocity acquired by the aircraft. If the latter acquires a rotational velocity about a turn axis lying normal to the spin axis of the rotor then the rotor will move relative to the body structure and will operate the gas control ring to stabilize the aircraft.

Figure 13:
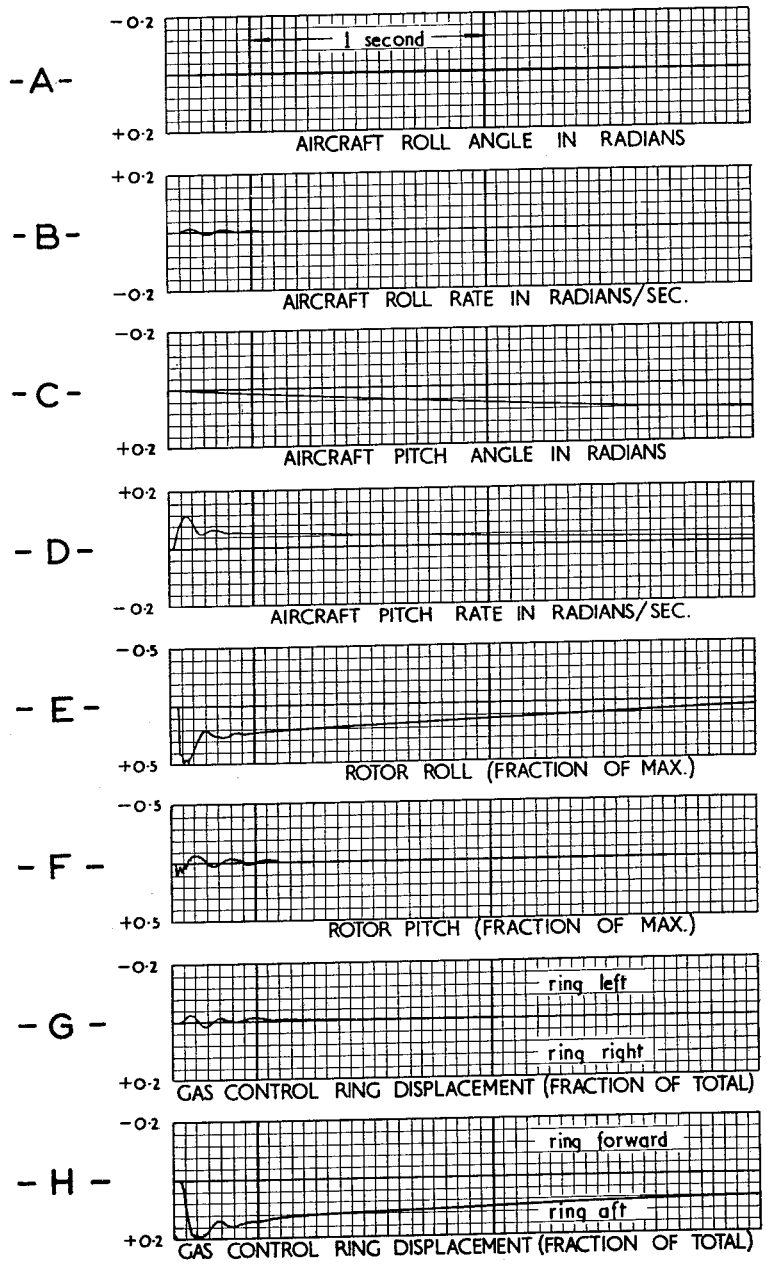
FIGURE 13 is a similar set of graphs showing the response of the aircraft to an upgust.

Thus, referring to FIGURE 13, there is shown a series of graphs illustrating the operation of the automatic stabilizing system when the aircraft hits an upgust in forward flight. The upgust imparts a nose-up pitch rate to the aircraft, i.e., a rate about an axis normal to the spin axis of the rotor. As the aircraft commences to pitch it will apply a pitching moment to the rotor which, due to the gyroscopic laws of precession, will roll as shown in graph E. The rotor will then oscillate in roll and pitch and will settle down to a gradually decreasing roll angle and virtually no pitch angle as shown in graphs E and F.

As a result of the rotor's movements, the gas control ring is moved as shown in graphs G and H. There is some initial oscillation in the left and right directions but the major displacement of the ring is rearwardly. This rearward movement increases the effective area at the rearward portion of the nozzle mouth and decreases the effective area of the forward portion of the nozzle mouth thus giving the aircraft a nose-down moment as described with reference to FIGURE 11. This nose-down moment opposes the nose-up moment imparted to the aircraft by the upgust and the pitch rate gradually decreases as shown in graph D. The pitch angle gradually increases as the pitch rate decreases but this may be corrected by the pilot as is necessary in a conventional aircraft when it hits an upgust. It will be seen from graphs A and B that the aircraft acquires substantially no roll angle and only a small initial oscillation in roll rate. The substantially zero roll angle is due to the use of a phase angle of 95° whereby the nose-down couple on the aircraft produces a couple on the rotor which opposes the gyro-couple applied to the aircraft by the rotor.

In the arrangement shown in FIGURE 7, movement of the base of the actuating shaft 58a in any given direction will act through the links 124 to rotate the composite levers 120, 121 thereby moving the wire rope cables 51a and the gas control ring 38a, and consequently the gas control surface, relative to the mouth of the nozzle. The composite levers 120, 121 are so arranged that, if the actuating shaft moves in a first direction, the gas control ring will move in a second direction advanced 25° clockwise from the first direction, i.e. the phase angle of the system is 25°. If reference is had to FIGURE 8 it will be clear how the tilting movement of the rotor acts through the actuating shaft 58a, the levers 120, 121 and the links 51a to move the gas directing ring 38a.

Thus, referring to FIGURE 9, if the base of the actuating shaft 58a moves in the direction of the arrow "X" the points on the gas control ring 38a which will move the greatest distances inboardly and outboardly will lie in a plane represented by the line 137 which is at 25° to the line 131 which represents the plane containing positions of the spin axis corresponding to the neutral and tilted positions of the rotor. The plane 137 is thus the control plane and if the circle 138 is taken to represent the gas control ring 38a, the points where the line 137 cuts the circle 138 will be the points of maximum travel of the ring 38a. Conversely, the points of least travel on the ring 38a will be the points of intersection of a plane represented by the line 139 and the circle 138. That part of the ring 38a represented by the semi-circle 140 will move outboardly and that part of the ring represented by the semi-circle 141 will move inboardly, the semi-circles being separated by the line 139.

The response of the control system of the embodiment of FIGURE 7 is very similar to the response of the control systems described in the aforesaid applications when the phase angle of said systems is 20°. Thus, suppose that the pilot, while hovering, moves his control column to the right, the actuators 59, 60 and 61 will apply a pitching moment to the rotor by rocking the actuating shaft 58a. The rotor acquires a pitch velocity and is then affected by the gyroscopic laws of motion and precession. The rotor will initially oscillate in both roll and pitch and will then acquire a steady state with a deflection in pitch and rather less of a deflection in roll. In this steady state the gas control ring is moved to tilt the curtain of gas under the aircraft. As the curtain is tilted its center of pressure moves away from the center of gravity of the aircraft. The reaction of the tilted curtain may be considered to consist of a force through the center of gravity of the aircraft plus a couple tending to turn the aircraft. The couple can be resolved into a component about the longitudinal axis of the aircraft which overcomes the aerodynamic damping of the aircraft and a component about the lateral axis of the aircraft which overcomes the gyroscopic moment and causes the aircraft to roll. After initial oscillation the aircraft acquires a substantially steady roll rate and a steadily increasing roll angle. The aircraft will be substantially undisturbed in pitch but will have an oscillating pitch rate which will be damped out.

If the aircraft is hovering and encounters a gust then the aircraft will begin to roll or pitch and will impart to the rotor a rolling or pitching force. Thus if the aircraft encounters a gust tending to roll it, the aircraft will acquire a roll rate and will impart a roll rate to the rotor which then follows the gyroscopic laws. After initial oscillation the rotor will reach a steady state with a deflection in roll and also a deflection in pitch. The steady state deflection of the actuating shaft acts through the links 51a to move the gas control ring to tilt the column of gas under the aircraft to reduce the divergence of the aircraft.

A fuller description of the principle of the control system is given in said aforementioned applications Serial Nos. 832,404 and 832,406. The phase angle of the control system described in the present application may either be between 0° and 90°, as in the previous applications, or the phase angle may be greater than 90° as hereinbefore described. If the phase angle is less than 90° then oscillation of the aircraft will take place upon manoeuvre when low control powers are used since there will be a component of control power tending to amplify the gyro-couple applied to the aircraft. When a phase angle of greater than 90° is used, there will be a component of control power tending to reduce or eliminate the gyro-couple applied to the aircraft.

It will be understood that the form of the invention herewith shown and described is a preferred example and various modifications can be carried out without departing from the spirit of the invention or the scope of the appended claims.

What I claim as my invention is:

1. An aircraft having a body structure; walls within the structure defining a gas displacement passage which includes and terminates in a propulsive nozzle having a mouth, one of said walls forming one boundary of the mouth and curving away therefrom in a smooth convex surface and the other wall forming another boundary of the mouth; means within the structure to impel propulsive gas along the passage and to expel the gas from the mouth; gas directing means; suspsension means interposed between the gas directing means and the structure to movably suspend the gas directing means adjacent to said other boundary of the mouth; said gas directing means having a gas control surface which forms a movable extension of said other boundary of the mouth and which is shaped to direct gas expelled from the mouth around said convex surface; and actuating means to move the gas directing means on its suspension means to vary the position of the gas control surface relative to said mouth and thus to variably control the direction of flow of the propulsive gas expelled from the mouth.

2. An aircraft having a body structure; walls within the structure defining a gas displacement passage which includes and terminates in a propulsive nozzle having a substantially annular mouth, one of said walls forming the radially inner boundary of the mouth and curving away therefrom in a smooth convex surface and the other wall forming the radially outer boundary of the mouth; means within the structure to impel propulsive gas along the passage and to expel the gas from the mouth; a gas control ring; suspension means interposed between the ring and the structure to movably suspend the ring adjacent to said radially outer boundary of the mouth; said ring having a gas control surface which forms a movable extension of said radially outer boundary and which is shaped to direct the gas expelled from the mouth around said convex surface; and actuating means to move the ring on its suspension means to vary the position of the gas control surface relative to said mouth and thus to variably control the direction of flow of the propulsive gas expelled from the mouth.

3. An aircraft having a body structure; upper and lower walls within the structure defining a gas displacement passage which includes and terminates in a downwardly directed propulsive nozzle having a mouth arranged to discharge at a multiplicity of positions distributed around a periphery on the underside of the structure, the lower wall forming the inboard boundary of the mouth and merging with the underside of the structure in a smooth, outboardly convex surface and the upper wall forming the outboard boundary of the mouth; means within the structure to impel propulsive gas along the passage and to expel the gas from the mouth; gas directing means; suspension means interposed between the gas directing means and the structure to movably suspend the gas directing means beneath, and adjacent to, the outboard boundary of the mouth; and actuating means to move the gas directing means on its suspension means thus to vary the position of the gas control surface relative to said mouth and to variably control the direction of flow of the propulsive gas expelled from the mouth.

4. An aircraft having a body structure; upper and lower walls within the structure defining a gas displacement passage which includes and terminates in a downwardly directed propulsive nozzle having a mouth arranged to discharge at a multiplicity of positions distributed around a periphery on the underside of the structure, the lower wall forming the inboard boundary of the mouth and merging with the underside of the structure in a smooth, outboardly convex surface and the upper wall forming the outboard boundary of the mouth; engine means within the structure to impel propulsive gas along the gas displacement passage and to expel the gas from said mouth; a gyroscope mounted in the structure to be capable of a limited degree of universal movement relative to the structure; biasing means interposed between the structure and the gyroscope to bias the latter to a neutral position within the structure; gas directing means; suspension means interposed between the gas directing means and the structure to movably support the gas directing means beneath, and adjacent to, the outboard boundary of the mouth; said gas directing means having a gas control surface which is shaped to direct gas expelled from the mouth generally inboardly and which forms a movable extension of the outboard boundary of the mouth; and actuating means interposed between the gyroscope and the ring and operable to move the gas directing means on its suspension means to vary the position of the gas control surface relative to said mouth and thus to variably control the direction of flow of the propulsive gas expelled from the mouth, said actuating means operating in response to tilting of the gyroscope from its neutral position.

5. An aircraft having a body structure; upper and lower walls within the structure defining a gas displacement passage which includes and terminates in a downwardly directed propulsive nozzle having a mouth arranged to discharge at a multiplicity of positions distributed around a periphery on the underside of the structure, the lower wall forming the inboard boundary of the mouth and merging with the underside of the structure in a smooth, outboardly convex surface and the upper wall forming the outboard boundary of the mouth; engine means within the structure to impel propulsive gas along the gas displacement passage and to expel the gas from said mouth, said engine means including an impelling rotor mounted in the structure to be capable of a limited degree of universal movement relative to the structure; biasing means interposed between the structure and the rotor to bias the latter to a neutral position within the structure; gas directing means; suspension means interposed between the gas directing means and the structure to movably support the gas directing means beneath, and adjacent to, the outboard boundary of the mouth; said gas directing means having a gas control surface which is shaped to direct gas expelled from the mouth generally inboardly and which forms a movable extension of the outboard boundary of the mouth; and actuating means interposed between the rotor and the gas directing means and operable to move the gas directing means on its suspension means to vary the position of the gas control surface relative to said mouth and thus to variably control the direction of flow of the propulsive gas expelled from the mouth, said actuating means operating in response to tilting of the rotor from its neutral position.

6. An aircraft having a body structure; upper and lower walls within the structure defining a gas displacement passage which includes and terminates in a downwardly directed propulsive nozzle having a substantially annular mouth in the underside of the structure, the lower wall forming the inboard boundary of the mouth and merging with the underside of the structure in a smooth, outboardly convex surface and the upper wall forming the outboard boundary of the mouth; means within the structure to impel propulsive gas along the passage and to expel the gas from the mouth; a gas control ring; suspension means interposed between the ring and the structure to movably suspend the ring beneath, and adjacent to, the outboard boundary of the mouth; said ring having a gas control surface which is shaped to direct gas expelled from the mouth generally inboardly and which forms a movable extension of the outboard boundary of the mouth; and actuating means to move the ring on its suspension means to vary the position of the gas control surface relative to said mouth and thus to variably control the direction of flow of the propulsive gas expelled from the mouth.

7. An aircraft having a body structure; upper and lower walls within the structure defining a gas displacement passage which includes and terminates in a downwardly directed propulsive nozzle having a substantially annular mouth on the underside of the structure, the lower wall forming the inboard boundary of the mouth and merging with the underside of the structure in a smooth, outboardly convex surface and the upper wall forming the outboard boundary of the mouth; engine means within the structure to impel propulsive gas along the gas displacement passage and to expel it from said mouth; a gyroscope mounted in the structure to be capable of a limited degree of universal movement relative to the structure; biasing means interposed between the structure and the gyroscope to bias the latter to a neutral position within the structure; a gas control ring; suspension means interposed between the ring and the structure and movably suspending the ring beneath, and adjacent to, the outboard boundary of the mouth, said ring having a gas control surface which is shaped to direct gas expelled from the mouth generally inboardly and which forms a movable extension of the outboard boundary of the mouth; and actuating means interposed between the gyroscope and the ring and operable to move the ring on its suspension means to vary the position of the gas control surface relative to said mouth and thus to variably control the direction of flow of the gas expelled from the mouth, said actuating means operating in response to tilting of the gyroscope from its neutral position.

8. An aircraft having a body structure; upper and lower walls within the structure defining a gas displacement passage which includes and terminates in a downwardly directed propulsive nozzle having a substantially annular mouth on the underside of the structure, the lower wall forming the inboard boundary of the mouth and merging with the underside of the structure in a smooth, outboardly convex surface and the upper wall forming the outboard boundary of the mouth; engine means within the structure to impel propulsive gas along the gas displacement passage and to expel the gas from said mouth, said engine means including an impelling rotor mounted in the structure to be capable of a limited degree of universal movement relative to the structure; biasing means interposed between the structure and the rotor to bias the latter to a neutral position within the structure; a gas control ring; suspension means interposed between the ring and the structure and movably suspending the ring beneath, and adjacent to, the outboard boundary of the mouth, said ring having a gas control surface which is shaped to direct gas expelled from the mouth generally inboardly and which forms a movable extension of the outboard boundary of the mouth; and actuating means interposed between the rotor and the ring and operable to move the ring on its suspension means to vary the position of the gas control surface relative to said mouth and thus to variably control the direction of flow of the gas expelled from the mouth, said actuating means operating in response to tilting of the rotor from its neutral position.

9. An aircraft having a lentiform body structure sheathed by opposed upper and lower aerofoil skins which provide lift surfaces for the aircraft; upper and lower walls within the structure defining a gas displacement passage which includes and terminates in a downwardly directed propulsive nozzle having a substantially annular mouth in the underside of the structure, the lower wall forming the inboard boundary of the mouth and merging with the underside of the structure in a smooth, outboardly convex surface and the upper wall forming the outboard boundary of the mouth; engine means within the structure to impel propulsive gas along the gas displacement passage and to expel the gas from said mouth, said engine means including an impelling rotor mounted in the structure to be capable of a limited degree of universal movement relative to the structure; biasing means interposed between the structure and the rotor to bias the latter to a neutral position within the structure; a gas control ring; suspension means interposed between the ring and the structure and movably suspending the ring beneath, and adjacent to, the outboard boundary of the mouth, said ring having a gas control surface which is shaped to direct gas expelled from the mouth generally inboardly and which forms a movable extension of the outboard boundary of the mouth; and actuating means interposed between the rotor and the ring and operable to move the ring on its suspension means to vary the position of the gas control surface relative to said mouth and thus to variably control the direction of flow of the propulsive gas expelled from the mouth, said actuating means operating in response to tilting of the rotor from its neutral position.

10. An aircraft having a lentiform body structure sheathed by opposed upper and lower aerofoil skins which provide lift surfaces for the aircraft; upper and lower walls within the structure defining a gas displacement passage which includes and terminates in a downwardly directed propulsive nozzle having a substantially annular mouth in the underside of the structure, the lower wall forming the inboard boundary of the mouth and merging with the underside of the structure in a smooth, outboardly convex surface and the upper wall forming the outboard boundary of the mouth; engine means within the structure to impel propulsive gas along the gas displacement passage and to expel the gas from said mouth, said engine means including an impelling rotor mounted in the structure to be capable of a limited degree of universal movement relative to the structure; biasing means interposed between the structure and the rotor to bias the latter to a neutral position within the structure; a gas control ring; suspension means interposed between the ring and the structure and movably suspending the ring beneath, and adjacent to, the outboard boundary of the mouth, said ring having a gas control surface which is shaped to direct gas expelled from the mouth generally inboardly and which forms a movable extension of the outboard boundary of the mouth; actuating means interposed between the rotor and the ring and operable to move the ring on its suspension means to vary the position of the gas control surface relative to said mouth and thus to variably control the direction of flow of the propulsive gas expelled from the mouth, said actuating means operating in response to tilting of the rotor from its neutral position; and pilot-operated control means operatively connected to the rotor and operable to apply a tilting force to the rotor thus operating the actuating means to cause a desired movement of the control ring.

11. An aircraft having a lentiform body structure sheathed by opposed upper and lower aerofoil skins which provide lift surfaces for the aircraft; upper and lower walls within the structure defining a gas displacement passage which includes and terminates in a downwardly directed propulsive nozzle having a substantially annular mouth in the underside of the structure, the lower wall forming the inboard boundary of the mouth and merging with the underside of the structure in a smooth, outboardly convex surface and the upper wall forming the outboard boundary of the mouth; engine means within the structure to impel propulsive gas along the gas displacement passage and to expel the gas from said mouth, said engine means including an impelling rotor mounted within the structure to be capable of a limited degree of universal movement relative to the structure; biasing means interposed between the structure and the rotor to bias the latter to a neutral position within the structure; an actuating shaft operatively connected to the rotor to tilt therewith; a gas control ring; suspension means interposed between the ring and the structure and movably suspending the ring beneath, and adjacent to, the outboard boundary of the mouth, said ring having a gas control surface which is shaped to direct gas expelled from the mouth generally inboardly and which forms a movable extension of the outboard boundary of the mouth; a plurality of spaced apart links extending outboardly from the actuating shaft to peripherally spaced points on the ring, whereby tilting of the rotor from its neutral position moves the ring on its suspension means to vary the position of the gas control surface relative to said mouth and thus to variably control the direction of flow of the propulsive gas expelled from the mouth; and pilot-operated control means operatively connected to the rotor and operable to apply a tilting force to the rotor thus operating the actuating means to cause a desired movement of the control ring.

12. An aircraft having a lentiform body structure sheathed by opposed upper and lower aerofoil skins which provide lift surfaces for the aircraft; upper and lower walls within the structure defining a gas displacement passage which includes and terminates in a downwardly directed propulsive nozzle having a substantially annular mouth in the underside of the structure, the lower wall forming the inboard boundary of the mouth and merging with the underside of the structure in a smooth, outboardly convex surface and the upper wall forming the outboard boundary of the mouth; engine means within the structure to impel propulsive gas along the gas displacement passage and to expel the gas from said mouth; a gyroscope mounted within the structure to be capable of a limited degree of universal movement relative to the structure; biasing means interposed between the structure and the gyroscope to bias the latter to a neutral position within the structure; an actuating member operatively connected to the gyroscope to tilt therewith; a ring member secured to the structure in a position to surround said actuating member but to leave an annular space between the members; a plurality of radially directed sensing nozzles in said space and secured to one of said members; a plurality of abutments in said space and secured to the other of said members so that an abutment is radially opposed to each of said sensing nozzles; means on the structure to supply pressure fluid to each sensing nozzle; means associated with each sensing nozzle to sense the variation in back-pressure in the nozzle as the space between the nozzle and its opposed abutment varies; a gas control ring; suspension means interposed between the ring and the structure and movably suspending the ring beneath, and adjacent to, the outboard boundary of the mouth, said ring having a gas control surface which is shaped to direct gas expelled from the mouth generally inboardly and which forms a movable extension of the outboard boundary of the mouth; a plurality of pressure-responsive actuators mounted in the structure; a plurality of links extending outboardly from said actuators to peripherally spaced points on the ring; means interconnecting said actuators with said pressure-sensing means of the sensing nozzles whereby variations in the pressures in the nozzles due to tilting of the gyroscope from its neutral position with consequent variation in the spacing between the nozzles and the abutments operates the actuators to move the ring on its suspension means to vary the position of the gas control surface relative to said mouth and thus to variably control the direction of flow of the propulsive gas expelled from the mouth; and pilot-operated control means in the structure to apply a tilting force to the gyroscope thus to cause a desired movement of the control ring.

13. An aircraft having a lentiform body structure sheathed by opposed upper and lower aerofoil skins which provide lift surfaces for the aircraft; upper and lower walls within the structure defining a gas displacement passage which includes and terminates in a downwardly directed propulsive nozzle having a substantially annular mouth in the underside of the structure; the lower wall forming the inboard boundary of the mouth and merging with the underside of the structure in a smooth, outboardly convex surface and the upper wall forming the outboard boundary of the mouth; engine means within the structure to impel propulsive gas along the gas displacement passage and to expel the gas from said mouth, said engine means including an impelling rotor mounted within the structure to be capable of a limited degree of universal movement relative to the structure; biasing means interposed between the structure and the rotor to bias the latter to a neutral position within the structure; an actuating member operatively connected to the rotor to tilt therewith; a ring member secured to the structure in a position to surround said actuating member but to leave an annular space between the members; a plurality of radially directed sensing nozzles in said space and secured to one of said members; a plurality of abutments in said space and secured to the other of said members so that an abutment is radially opposed to each of said sensing nozzles; means on the structure to supply pressure fluid to each sensing nozzle; means associated with each sensing nozzle to sense the variation in back pressure in the nozzle as the space between the nozzle and its opposed abutment varies; a gas control ring; suspension means interposed between the ring and the structure and movably suspending the ring beneath, and adjacent to, the outboard boundary of the mouth, said ring having a gas control surface which is shaped to direct gas expelled from the mouth generally inboardly and which forms a movable extension of the outboard boundary of the mouth; a plurality of fluid-operated jacks mounted in the structure around said ring member; a plurality of links extending outboardly from said jacks to peripherally spaced points on the ring; means interconnecting said jacks with said pressure-sensing means of the sensing nozzles whereby variations in the pressures in the nozzles due to tilting of the rotor from its neutral position with consequent variation in the spacing between the nozzles and the abutments operates the jacks to move the ring on its suspension means to vary the position of the gas control surface relative to said mouth and thus to variably control the direction of flow of the propulsive gas expelled from the mouth; and pilot-operated control means in the structure to apply a force to the actuating member to tilt the rotor and thus to cause a desired movement of the control ring.

14. An aircraft having a body structure; upper and lower walls within the structure defining a gas displacement passage which includes and terminates in a downwardly directed propulsive nozzle having a substantially annular mouth on the underside of the structure, the lower wall forming the inboard boundary of the mouth and merging with the underside of the structure in a smooth, outboardly convex surface and the upper wall forming the outboard boundary of the mouth; means within the structure to impel propulsive gas along the passage and to expel the gas from the mouth; a gas control ring; suspension means to movably suspend the ring beneath and adjacent to the outboard boundary of the mouth; said ring having a gas control surface of inverted frusto-conical form shaped to direct gas expelled from the mouth generally inboardly and which forms a movable extension of the outboard boundary of the mouth; and actuating means to move the ring on its suspension means to vary the position of the gas control surface relative to said mouth and thus to variably control direction of flow of the propulsive gas expelled from the mouth.

15. A control system for an aircraft having a body structure; engine means within the structure to provide propulsive gas, the engine means including a rotor rotatable about a spin axis and having a neutral position relative to the body structure, the rotor having a limited degree of universal movement; a gas displacement passage along which the propulsive gas is impelled by the rotor; and a propulsive nozzle communicating with the gas displacement passage and arranged to discharge the propulsive gas at a multiplicity of positions distributed around a periphery on the structure; the control system comprising biasing means associated with the rotor to bias it to its neutral position to allow relative movement between the rotor and the body structure, with consequent tilting of the rotor from its neutral position and application of a gyro-couple to the aircraft, when the aircraft acquires a rotational velocity about a turn axis lying normal to the spin axis; gas directing means associated with the nozzle and operable to variably control the flow characteristics of the propulsive gas discharged from the nozzle at any selected position of said multiplicity of positions; a link system interposed between the rotor and the gas directing means to operate the latter in response to tilt of the rotor from its neutral position and in a manner determined by the tilted position of the rotor; individual links of the system being operatively coupled to correlated portions of the gas directing means spaced around said periphery; the response of the link system to tilt of the rotor causing operation of opposite peripheral portions of the gas directing means lying adjacent to a control plane which contains the position of the spin axis corresponding to the neutral position of the rotor and is advanced in the direction of rotation of the rotor by a phase angle $\alpha$ relative to the plane containing the positions of the spin axis corresponding to the neutral and tilted positions of the rotor, the phase angle having a value greater than 90°; operation of the gas directing means as a result of a disturbance which imparts a rotational velocity to the aircraft about a turn axis controlling the flow characteristics of the propulsive gas discharged from peripherally opposite portions of the propulsive nozzle to apply a force to the aircraft to reduce the divergence of the aircraft incident upon said disturbance; the force having a first component proportional to cosine $\alpha$ and which opposes and reduces the said gyro-couple and a second component proportional to sine $\alpha$ which directly opposes said rotational velocity.

16. An aircraft having a body structure; upper and lower walls within the structure defining a gas displacement passage which includes and terminates in a downwardly directed nozzle having a mouth arranged to discharge at a multiplicity of positions distributed around a periphery on the underside of the structure, the lower wall forming the inboard boundary of the mouth and merging with the underside of the structure in a smooth, outboardly convex surface and the upper wall forming the outboard boundary of the mouth; engine means within the structure to provide propulsive gas, the engine means including a rotor rotatable about a spin axis and having a neutral position relative to the body structure, the rotor having a limited degree of universal movement; gas directing means; suspension means interposed between the gas directing means the structure to movably suspend the gas directing means beneath, and adjacent to, the outboard boundary of the mouth; said gas directing means having a gas control surface which is shaped to direct gas expelled from the mouth generally inboardly and which forms a movable extension of the outboard boundary of the mouth; and a control system to move the gas directing means on its suspension means to vary the position of the gas control surface relative to said mouth and thus to variably control the direction of flow of the propulsive gas expelled from the mouth; the control system comprising biasing means associated with the rotor to bias it to its neutral position and to allow relative movement between the rotor and the body structure, with consequent tilting of the rotor from its neutral position and application of a gyro-couple to the aircraft, when the aircraft acquires a rotational velocity about a turn axis lying normal to the spin axis; and a link system between the rotor and the gas directing means to operate the latter in response to tilt of the rotor from its neutral position and in a manner determined by the tilted position of the rotor; individual links of the system being operatively coupled to correlated portions of the gas directing means; the response of the link system to tilt of the rotor causing operation of the opposite peripheral portions of the gas directing means lying adjacent to a control plane which contains the position of the spin axis corresponding to the neutral position of the rotor and is advanced in the direction of rotation of the rotor by a phase angle α relative to the plane containing the positions of the spin axis corresponding to the neutral and tilted positions of the rotor, the phase angle having a value between 0° and 90° inclusive; operation of the gas directing means as a result of the disturbance which imparts a rotational velocity to the aircraft about a turn axis controlling the gas directing means to apply a force to the aircraft to reduce the divergence thereof incident upon said disturbance, the force having a first component proportional to cosine α and which amplifies said gyro-couple and a second component proportional to sine α which directly opposes said rotational velocity.

17. An aircraft having a body structure; upper and lower walls within the structure defining a gas displacement passage which includes and terminates in a downwardly directed nozzle having a mouth arranged to discharge at a multiplicity of positions distributed around a periphery on the underside of the structure, the lower wall forming the inboard boundary of the mouth and merging with the underside of the structure in a smooth, outboardly convex surface and the upper wall forming the outboard boundary of the mouth; engine means within the structure to provide propulsive gas, the engine means including an impelling rotor rotatable about a spin axis and having a neutral position relative to the body structure, the rotor having a limited degree of universal movement; gas directing means; suspension means interposed between the gas directing means and the structure to movably suspend the gas directing means beneath, and adjacent to, the outboard boundary of the mouth; said gas directing means having a gas control surface which is shaped to direct gas expelled from the mouth generally inboardly and which forms a movable extension of the outboard boundary of the mouth; and a control system to move the gas directing means on its suspension means to vary the position of the gas control surface relative to said mouth and thus to variably control the direction of flow of the propulsive gas expelled from the mouth; the control system comprising the biasing means associated with the rotor to bias it to its neutral position and to allow relative movement between the rotor and the body structure, with consequent tilting of the rotor from its neutral position and application of a gyro-couple to the aircraft, when the aircraft acquires a rotational velocity about a turn axis lying normal to the spin axis; and a link system between the rotor and the gas directing means to operate the latter in response to tilt of the rotor from its neutral position and in a manner determined by the tilted position of the rotor; individual links of the system being operatively coupled to correlated portions of the gas directing means; the response of the link system to tilt of the rotor causing operation of opposite peripheral portions of the gas directing means lying adjacent to a control plane which contains the position of the spin axis corresponding to the neutral position of the rotor and is advanced in the direction of rotation of the rotor by a phase angle α relative to the plane containing the positions of the spin axis corresponding to the neutral and tilted positions of the rotor, the phase angle having a value greater than 90°; operation of the gas directing means as a result of a disturbance which imparts a rotational velocity to the aircraft about a turn axis controlling the flow characteristics of the propulsive gas discharged from the mouth to apply a force to the aircraft to reduce the divergence of the aircraft incident upon said disturbance; the couple having a first component proportional to cosine α and which opposes and reduces said gyro-couple and a second component proportional to sine α which directly opposes said rotational velocity.

References Cited in the file of this patent

UNITED STATES PATENTS

| | | |
|---|---|---|
| 2,838,257 | Wibault | June 10, 1958 |
| 2,990,137 | Willis | June 27, 1961 |